May 8, 1951 G. V. RYLSKY ET AL 2,552,383
ILLUMINATED POLARIZED INSTRUMENT SCALE
Original Filed May 10, 1943 2 Sheets-Sheet 1
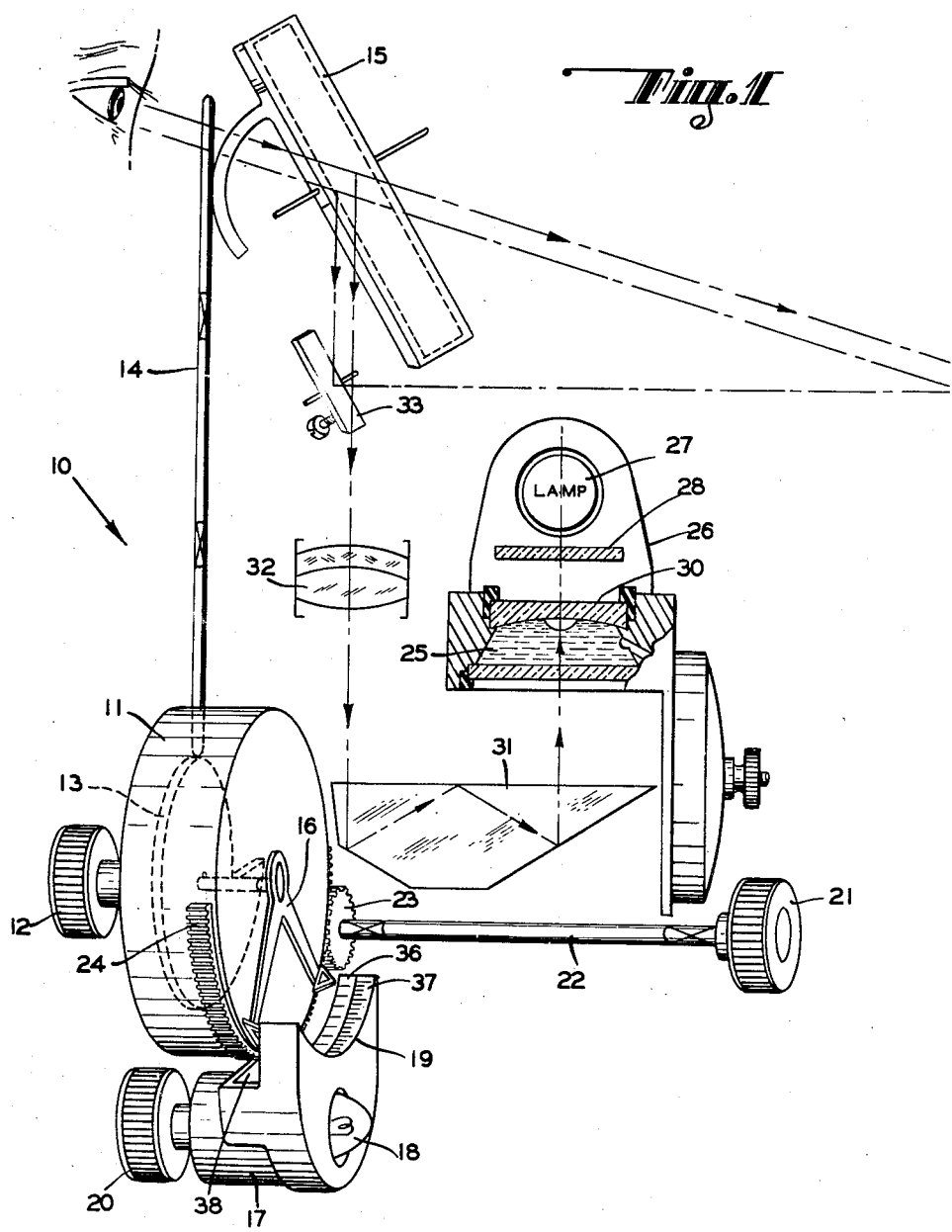
INVENTORS
GREGORY V. RYLSKY
FREDERICK W. SCHULE
BY
ATTORNEY

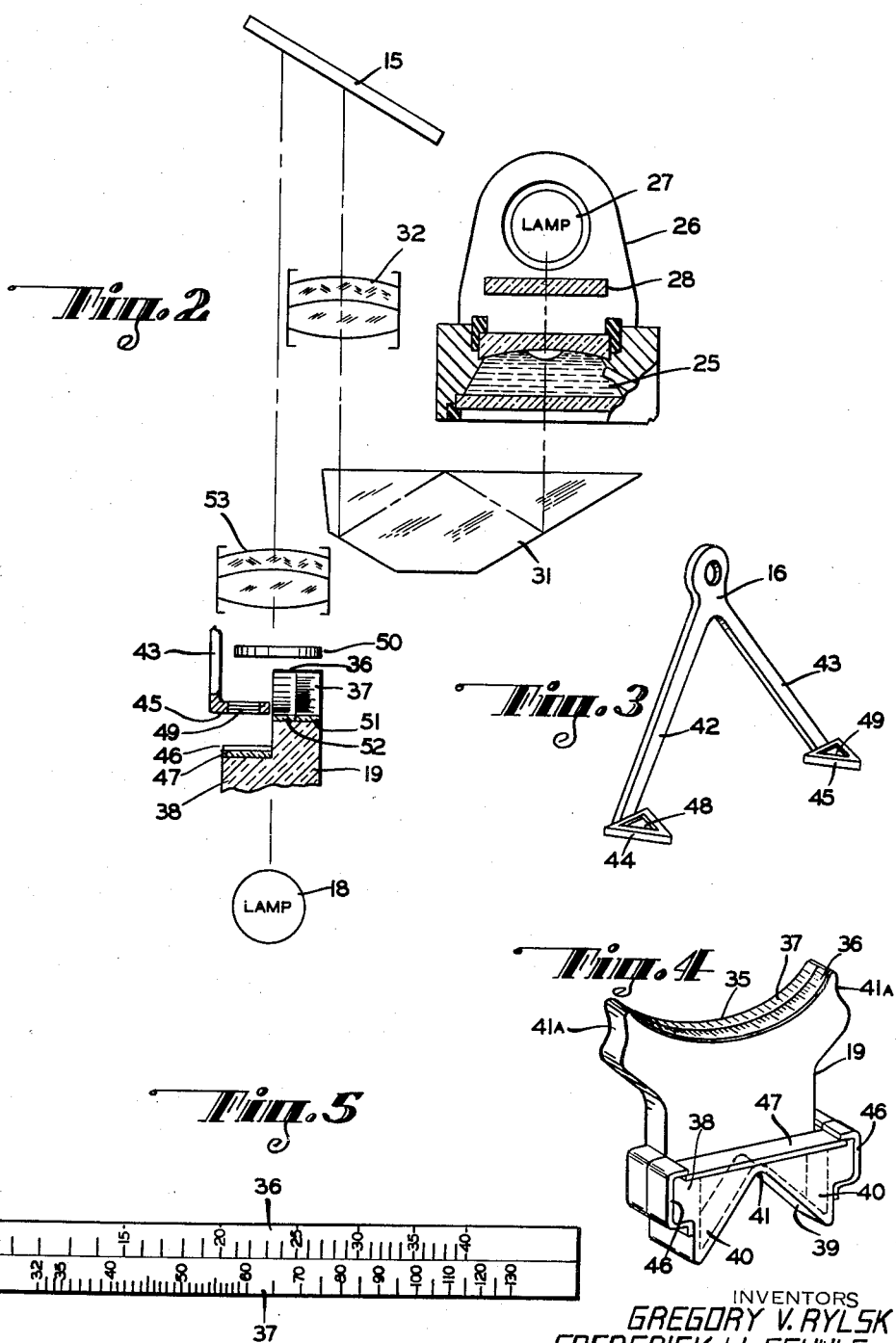

Patented May 8, 1951

2,552,383

UNITED STATES PATENT OFFICE 2,552,383

ILLUMINATED POLARIZED INSTRUMENT SCALE

Gregory V. Rylsky, Ridgefield Park, and Frederick W. Schule, Hackensack, N. J., assignors to Bendix Aviation Corporation, Teterboro, N. J., a corporation of Delaware Original application May 10, 1943, Serial No. 486,376. Divided and this application April 9, 1946, Serial No. 660,592

9 Claims. (Cl. 88—65)

This invention relates to sighting instrument scales, and more particularly to a pointer and scale system for a sighting instrument whereby the images thereof are reflected into the line of vision of the observer.

This invention is a division of our copending application for a Hand Held Low Altitude Bombsight bearing Serial No. 486,376 filed on May 10, 1943, now Patent No. 2,404,746 issued July 23, 1946.

An object of our present invention is to provide a pointer and scale system for sighting instruments whereby the sighting of said instrument and the reading of said scale may be done simultaneously.

Another object of our invention is to provide a pointer and scale system for sighting instruments in which the images of the scale and pointer projected into the line of vision of the observer are at infinite focus so as to appear to be at the same distance as the object sighted.

A further object of the present invention is to provide a pointer and scale system for sighting instruments wherein the illumination intensity of a source of light is eliminated by polarizing screens whose planes of polarization are approximately at right angles to each other in said system.

Yet another object of this invention is to provide a scale and pointer system of the character indicated with a telescoped or folded scale which shall be readily readable by an observer using the sighting instrument.

Still a further object of the invention is to provide a pointer and scale system for sighting instruments in which the scale element thereof forms an optical part therein.

Still another object of our invention is to provide a highly improved scale and pointer system of the character described which shall consist of relatively few and simple parts, which shall be inexpensive to manufacture, which shall have a large variety of applications in sighting and viewing instruments generally, and which shall nevertheless, be practical and efficient to a high degree in use.

Other objects of this invention will in part be obvious, and in part hereinafter pointed out.

The invention accordingly consists in the features of construction, combinations of elements, and arrangement of parts which will be exemplified in the construction hereinafter described, and of which the scope of application will be indicated in the appended claims.

In the accompanying drawings, in which one of the various possible illustrative embodiments of this invention is shown, Figure 1 is a diagrammatic view showing part of the elements in perspective of the optical system and mechanism of the aforesaid parent application, Figure 2 is a diagrammatic view, portions of which are in cross-section, of an optical system similar to that shown in Figure 1, Figure 3 is a perspective view of a double pointer structure, Figure 4 is a perspective view of the optical scale element, while Figure 5 is a plan view of a telescoped or folded scale.

Referring now in detail to Figure 1, 10 designates the mechanism of the bombsight claimed in our copending application bearing Serial No. 486,376. The mechanism 10 comprises a rotatable drum 11 housing a barometric pressure element (not shown), the response of which is adapted to be adjusted by setting knob 12. Fixed to said drum and rotatable therewith is a cam 13 adapted to move a link 14 to tilt a transparent viewing plate 15 with respect to the horizontal.

Rotatable with respect to the drum 11 is a double pointer 16 actuated by the expansion and contraction of the barometric pressure member within said drum. Adjacent to said drum is a scale and lamp housing 17, comprising a lamp 18, a scale member 19, and a setting knob 20 for adjusting a rheostat in the circuit (not shown) of said lamp to control the intensity of illumination thereof. The double pointer 16 is read with respect to said scale member 19 and is adjustable thereto by means of a setting knob 21, shaft 22, pinion 23, and sector gear 24 fixed to the drum 11.

A bubble level 25 is provided for indicating the approximate level position of the instrument, and to indicate by way of its projected image on the viewing plate 15, the point of bomb impact on the ground.

To this end, the level 25 is mounted in a lamp housing 26 provided with a lamp 27, and a light diffusing screen 28. The bubble level is illuminated by the indirect lighting thus provided, the image of said bubble being reflected downwardly by a lens 30 forming a part of the bubble level, thence through a prism 31 and through the collimating lens 32 to the viewing plate 15.

An image of the horizon is also reflected onto the viewing plate 15 to enable the observer to hold the bombsight in a level position, by way of a small pre-adjustable mirror 33.

Briefly, the double pointer 16 is moved with respect to the scale member 19 by the barometric pressure member (not shown), the angular displacement of the pointer 16 being a logarithmic function of the altitude of a plane over the target. A logarithmic function of ground speed is inserted into the mechanism by rotation of the setting knob 21. Rotation of the drum 11 will adjust the pointer 16 with respect to the scale member 19 which is laid off in ground speed. Rotation of the drum will also rotate cam 13 to tilt the viewing plate 15 to the proper angle to indicate the point of bomb impact.

A more detailed description of the bombsight mechanism and its operation may be had by referring to the aforesaid parent application.

Referring now to Figures 2, 3, 4 and 5 of the drawings in which the specific invention is shown, the scale number 19 is made of a transparent, light-conducting material. The scale portion 35 of said member is made circular of approximately the same radius as the length of the arms of the double pointer 16. The scale portion 35 is made similar to a section of a circular slide rule in that the scale divisions thereon are angularly spaced proportional to the logarithm rather than linearly spaced. Two logarithmic proportioned scales 36 and 37 representing ground speed are laid off on said portion. The two scales overlap in values, scale 36 being laid off in speeds from 10 miles per hour to 40 miles per hour, while scale 37 is laid off in speeds from 32 miles per hour to 130 miles per hour (Figure 5).

The scale member 19 is further provided with an offset portion 38 adjacent to but just below the scales 36 and 37. (Figures 2 and 4.) The offset portion 38 is clear and preferably polished to eliminate any refracting surfaces due to scratches in the surface thereof.

The lower portion of the scale member 19 is bifurcated, the inner surfaces 39 of the legs 40 thus formed, being highly polished and approximately at 90° to each other; the sharp corner between the surfaces being rounded to form an arcuate surface 41. With the scale member 19 inserted into the lamp housing 17, the lamp 18 therein is straddled by the legs 40 so that the light from said lamp will be transmitted through said scale member to the scales 36 and 37 and the offset portion 38.

The double pointer 16 is made of a light weight material and comprises two arms 42 and 43 angularly disposed with respect to each other. The lower ends of said arms are provided with triangular frames 44 and 45, respectively, at right angles to said arms and extending over the offset portion 38 of the scale member 19 but falling just short of the edge of scale 36. The length of arms 42, 43 are approximately equal to the radius of the curved scale portion of member 19 to prevent parallax error in the reading of the scales. Frame 45 is adapted to be read with respect to scale 36, while frame 44 is read with respect to scale 37 as will hereinafter be made more apparent.

The angular disposition of arms 42 and 43 is such, that as frame 45 is nearing the upper end of scale 36, frame 44 is beginning to move over the lower end of scale 37. There is thus provided a folded or telescoped scale which occupies but half of the space required of a one piece scale and upon which the figures and index markings may be sufficiently large and clear to facilitate the readings thereof with respect to the double pointer 16.

Means is now provided to project the images of scales 36 and 37 and the triangular frames 44 and 45 onto the viewing plate 15 so that the sighting of the instrument and the reading on the scales may be done simultaneously without obscuring the object sighted by brilliant images of the scale members.

To this end polarized and birefringent screen elements are provided for the pointer elements described.

Fixed over the offset portion 38 of the scale member 19 as by clips 46, is a light polarizing strip 47. The triangular frames 44, 45 are fitted with screen elements 48 and 49, made of a birefringent or light polarizing material. For the purposes hereinafter appearing, the elements 48 and 49 are preferably of different colors, element 48 may be red, while element 49 may be green. Suitably fixed in a plane parallel to that of strip 47 and above the scale member 19 and the pointer frames 44 and 45 is a screen 50 made of a light polarizing material.

The planes of polarization of the strip 47 and the screen element 50 are at right angles to each other. The illumination of lamp 18 is thus polarized in one direction by the strip 47, and completely absorbed by the screen element 50. Thus no light will be projected upwardly from the offset portion 38 onto the viewing plate 15.

If the triangular screen elements 48, 49 are made of a birefringent material, it will be found when the material is rotated between the polarized screens, that the degree of illumination transmitted through the three elements will vary in accordance with the angular displacement of the birefringent material. In the case of a colored birfringent material, the color of the element will be visible. A rotation of 90° of a birefringent screen will vary the light transmitted from a zero value to a maximum value at 45° with a gradual decrease in light until 90° is reached, at which point no light is again transmitted. If the screen elements 48 and 49 are made of a light polarizing material the same light transmitting conditions will be observed. Thus the screen elements 48 and 49 are so disposed within their respective frames that the plane of polarization due to strip 47 is rotated to permit the viewing of the triangular elements through the polarized screen 50.

To dim the illumination intensity of scales 36 and 37 and yet to provide readily discernible scales, a colored birefringent material is superimposed over the scales 36 and 37. A red strip 51 is fixed over scale 37 while a green strip 52 is fixed over scale 36. Thus the red colored scale 37 is read with respect to the red colored frame 44, while the green colored scale 36 is read with respect to the green colored frame 45. The images of the scales and pointers are projected onto the viewing plate by the collimating lens 32, together with the image of the bubble level 25 in the system shown in Figure 1.

It will be apparent that various changes may be made in the embodiment hereinabove described. For example, the polarizing element could be positioned below the scale member 19 so that polarized light will be transmitted through the scale member, thence through the screen elements 48, 49, and through the polarized screen 50, as shown in Fig. 5 of the aforesaid parent application.

The images of the scales and pointers in the optical system shown in Figure 2, will be projected onto the viewing plate by a collimating lens 53, while the bubble image will be projected by the colluminating lens 32. The use of a second collimating lens 53 in Figure 2 gives a greater clarity and angular displacement of the scale images than would be possible when using the single lens 32 of Figure 1.

In the foregoing description and accompanying drawings, the present invention has been illustrated in connection with a bombsight having a transparent viewing plate. It is readily apparent that the invention may be readily adapted to other types of sighting instruments, and in which objective eyepiece lenses are used. Thus in a driftmeter, such as disclosed in the U. S. Patent No. 2,276,284 issued to S. M. Burka et al., the images of the scale and pointer could be focused onto the focal plane of the eyepiece in much the same manner as the image of the reticle is reflected to the eyepiece disclosed in that reference.

It will thus be seen that there is provided a pointer and scale system for sighting instruments in which the several objects of this invention are achieved, and which is well adapted to meet the conditions of practical use.

As various possible embodiments might be made of the above invention, and as various changes may be made in the embodiment above set forth and illustrated, it is to be understood that all matter herein set forth and shown in the accompanying drawings, is to be interpreted as illustrative and not in a limiting sense.

Having thus described our invention, we claim as new and desired to secure by Letters Patent:

1. A scale and pointer system comprising viewing member, a transparent scale member, a pointer of material for rotating the plane of polarization of polarized light adapted to be moved adjacent to said scale member, two light polarizing screens, said pointer moving therebetween; the polarizing planes of said screens being at right angles to each other, and a collimating optical system including a source of illumination, said scale member, pointer, and screens being within said optical system whereby the images of said scale member and said pointer are projected to said viewing member.

2. In a scale and pointer system, a scale having indicia to denote values, a pointer of birefringent material movable relative to said scale to indicate the values on said scale, a source of illumination for said scale and said pointer, a light polarizer for said source disposed to polarize the light rays illuminating said pointer, and a polarizing screen disposed in the path of the light rays from said pointer, the plane of polarization of said screen being substantially at right angles to that of said polarizer, said birefringent material being arranged so that light rays therefrom are transmitted through said polarizing screen, and means for viewing said scale and pointer.

3. A scale and pointer system comprising a semitransparent viewing plate, a scale having indicia to denote values, a pointer of birefringent material movable relative to said scale to indicate the values on said scale, a light source for illuminating said scale and pointer by transmitted light rays, a light polarizer for said source disposed to polarize the light rays to said pointer, a polarizing screen disposed in the path of the light rays transmitted through said pointer, the plane of polarization of said polarizing screen being substantially at right angles to that of said polarizer, and said birefringent material being arranged so that light rays therefrom are transmitted through said polarizing screen, and a lens for projecting the images of said scale and pointer onto said viewing plate.

4. A scale and pointer system comprising a viewing screen, a scale member of partial light transmitting material having at least two adjoining scales with one scale being a continuation of the other scale, a pointer having an arm for each of the scales, said arms being movable together relative to said scales and being disposed angularly to one another so that each of said arms may be read sequentially on the associated scale, a source of illumination for said scales and said pointer arms, the light rays from said source being transmitted through said scale member, a light polarizer for said source positioned to polarize the light rays to said pointer arms, an element movable with each of said pointer arms and positioned in the path of the polarized light rays and formed of a material for rotating the plane of polarization of the light rays, a polarizing screen disposed in the path of the light rays from said element, the plane of polarization of said polarizing screen being normal to that of said polarizer, and a lens for projecting the images of said scales and pointer arms onto said viewing screen.

5. A scale and pointer system comprising a semi-transparent viewing plate, a scale member of light transmitting material, at least two differently colored scales laid off on said member with one of said scales being a continuation of the other scale, a pointer having an arm including birefringent material for each of said scales, the color of the material for each of said arms corresponding to the color of the associated scale, said arms being movable together relative to said scales and being disposed angularly relative to one another so that each of the arms may be read sequentially on the associated scale, a source of illumination for said scales and said pointer arms, the light rays from said source being transmitted through said scale member, a light polarizer for said source positioned to polarize the light rays to said pointer arms, a polarizing screen disposed in the path of the light rays transmitted through said pointer arms, the plane of polarization of said polarizing screen being substantially normal to that of said polarizer, and a collimating lens system for projecting the colored images of said scales and pointer arms onto said viewing plate.

6. A scale and pointer system comprising a scale member of light transmitting material, at least two differently colored scales laid off on said member with one scale being a continuation of the other scale, a pointer having an arm at least partially of birefringement material for each of said scales, the color of the material for each of said arms corresponding to the color of the associated scale, said arms being movable together relative to said scales and being disposed angularly relative to one another so that each of said arms may be read sequentially on the associated scale, a source of illumination for said scales and said pointer arms, a light polarizer interposed in the path of the light rays from said source to said pointer arms, and a polarizing screen in the path of the light rays from said pointer, the plane of polarization of said polarizing screen being substantially normal to that of said polarizer.

7. A scale and pointer system comprising a scale having indicia to denote values, a pointer at least partially of birefringent material adapted to be moved relative to said scale to indicate the values on said scale, a light source for illuminating said scale and pointer by transmitted light rays, a light polarizer for said source disposed to polarize the light rays to said pointer, and a polarizing screen positioned in the path of the light rays from said pointer, the plane of polarization of said screen being substantially normal to that of said polarizer and said birefringent material being arranged so that light rays therefrom are transmitted through said polarizing screen.

8. In a scale and pointer system, a scale member having at least two adjoining scales with one scale being a continuation of the other scale, a pointer having an arm at least partially of birefringent material for each of said scales, said arms being movable together relative to said scales and being disposed angularly to one another so that each of said arms may be read sequentially on the associated scale, a source of illumination for said scales and said pointer arms, a light polarizer for said source positioned to polarize the light rays to said pointer arms, and a polarizing screen disposed in the path of the light rays from said pointer arms, the plane of polarization of said polarizing screen being normal to that of said polarizer 9. In a scale and pointer system, a scale having indicia to denote values, a pointer movable relative to said scale to indicate said values, a light source for illuminating said scale and ponter, a light polarizer for said source disposed to polarize the light rays to said pointer, and a polarizing screen positioned in the path of the light rays from said pointer and having its plane of polarization disposed substantially normal to that of said polarizer, said pointer including means to rotate the plane of polarization of the light rays passing therethrough from said polarizer so that light rays from said pointer pass said polarizing screen.

GREGORY V. RYLSKY.
FREDERICK W. SCHULE.

REFERENCES CITED

The following references are of record in the file of this patent:

UNITED STATES PATENTS

| Number | Name | Date |
| --- | --- | --- |
| 687,213 | Ennis | Nov. 26, 1901 |
| 1,011,285 | Verplast | Dec. 12, 1911 |
| 1,635,479 | Hutchinson | July 12, 1927 |
| 2,014,531 | Knopf | Sept. 17, 1935 |
| 2,100,875 | Scantlebury | Nov. 30, 1937 |
| 2,123,743 | Pratt | July 12, 1938 |
| 2,169,022 | Chubb | Aug. 8, 1939 |
| 2,192,860 | Bennett et al. | Mar. 5, 1940 |
| 2,221,152 | Rylsky | Nov. 12, 1940 |
| 2,251,021 | Nebergall | July 29, 1941 |
| 2,393,968 | Burchell et al. | Feb. 5, 1946 |
| 2,404,746 | Rylsky et al. | July 23, 1946 |
| 2,454,280 | Hardesty | Nov. 23, 1948 |

FOREIGN PATENTS

| Number | Country | Date |
| --- | --- | --- |
| 702,024 | Germany | Jan. 29, 1941 |